United States Patent Office 3,271,341
Patented Sept. 6, 1966

3,271,341
AQUEOUS COLLOIDAL DISPERSIONS
OF POLYMER
William Emmett Garrison, Jr., Wilmington, Del., assignor to E. I. du Pont de Nemours and Company, Wilmington, Del., a corporation of Delaware
No Drawing. Filed Aug. 7, 1961, Ser. No. 129,526
21 Claims. (Cl. 260—29.6)

The present invention relates to the preparation of aqueous colloidal dispersions of polymer, and, more particularly, to the use of novel dispersing agents in the preparation of aqueous colloidal polymer dispersions.

It is the principal object of the present invention to provide dispersing agents which are suitable for use in the polymerization of ethylenically unsaturated monomers to form aqueous colloidal dispersions of polymer. Another object is to provide dispersing agents which do not adversely affect the rate of degree of polymerization of the ethylenic monomer but aid in the formation and stabilization of colloidal polymer particles and in the solubilization of the ethylenic monomer in the aqueous phase. Other objects will become apparent hereinafter.

The objects of the present invention are accomplished by carrying out the polymerization of a polymerizable monomeric monoethylenically unsaturated compound in an aqueous medium containing a water-soluble polymerization initiator and, as an ionizable dispersing agent, a water-soluble compound having the general formula

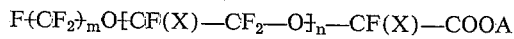

where X is a member of the class consisting of fluorine and the perfluoromethyl radical, $m$ is a positive integer of 1 to 5 inclusive and $n$ is a positive integer from 0 to 10, and A is a hydrophilic radical of the class consisting of hydrogen and monovalent salt radicals.

The polymerization of the monomer in an aqueous medium containing a dispersing agent as herein defined and a polymerization initiator to obtain an aqueous colloidal dispersion of the polymer is carried out in accordance with the known general procedures. Pressures of 1 to 3000 atmospheres and temperatures of 0° C. to 200° C. or higher can be used, the preferred ranges being a pressure of 10 to 100 atmospheres and a temperature of 50° C. to 130° C. The polymerization initiator is a water-soluble, free radical-producing initiator, preferably a water-soluble peroxy compound which can be inorganic, e.g., persulfates, perborates, percarbonates, hydrogen peroxide, or organic, e.g., disuccinic acid peroxide. There may also be used water-soluble, azo initiators, e.g., disodium-γ,γ-azobis(γ-cyanovalerate) or α,α'-azodiisobutyramidine hydrochloride. The initiator is normally used in proportions of 0.001% to 5%, based on the weight of polymerizable monomer employed.

The dispersing agents employed in the present invention are polyether acids and salts which may be obtained by the polymerization of tetrafluoroethylene epoxide or hexafluoropropylene epoxide and subsequent hydrolysis. Hexafluoropropylene expoxide is prepared by the reaction of hexafluoropropylene with aqueous alkaline hydrogen peroxide. Tetrafluoroethylene epoxide is prepared by the oxidation of tetrafluoroethylene using molecular oxygen, ultraviolet light radiation and a trace of a halogen such as bromine.

The polymerization of tetrafluoroethylene epoxide or hexafluoropropylene epoxide may be carried out by contacting the epoxide with a suitable free radical-forming catalyst such as activated charcoal. A specific procedure for the polymerization is as follows: In a dry nitrogen atmosphere, a 500 ml. stainless steel cylinder is charged with 28.6 g. of "Darco" 12 x 20 activated carbon which has been dried for 12 hours at 400° C. in vacuo. The cylinder is cooled to liquid nitrogen temperatures and 400 g. of hexafluoropropylene epoxide is charged into the cylinder. The reaction mixture, under autogenous pressure, is allowed to come to room temperature, where it is maintained for approximately three days. The reaction mixture is then distilled through a column under suitable conditions. Various fractions of the polyether having the general formula:

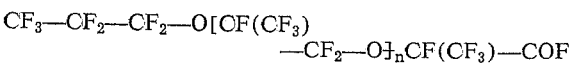
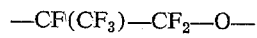

where $n$ indicates the number of repeating $$-CF(CF_3)-CF_2-O-$$

units and differing in degree of polymerization ($n+2$) are obtained.

In a specific example using the described procedure, the conversion to dimer ($n=0$) is about 12%, to trimer ($n=1$) about 5%, to polymers boiling up to 285° C. at 0.12 mm. Hg pressure ($n=2-35$) about 50% and to polymers boiling above 285° C. at 0.12 mm. Hg pressure ($n>35$) about 8%. Approximately 25% of unreacted hexafluoropropylene epoxide is recovered. Tetrafluoroethylene epoxide is polymerized in substantially the same way to result in polyethers having the general formula

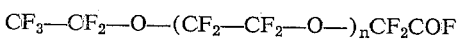

where $n$ indicates the number of $-CF_2-CF_2-O-$ groups and $n+2$ is the degree of polymerization. The product can be distilled to isolate various fractions differing in the degree of polymerization.

The modification of the perfluoroalkyl end of the polyether acid is achieved by carrying out the polymerization in the presence of a perfluoroalkyl acid fluoride. Thus, the presence of carbonyl fluoride results in a perfluoromethyl end group in the polymerization of hexafluoropropylene epoxide, the presence of perfluoroacetyl fluoride in a perfluoroethyl group, etc. The following experimental procedure illustrates this modification in the polymerization of hexafluoropropylene epoxide using a cesium fluoride as the polymerization catalyst: Into a 320 ml. stainless steel shaker tube is charged 25 g. of cesium fluoride, 40 ml. of diethylene glycol dimethyl ether, 38 g. of carbonyl fluoride and 193 g. of hexafluoropropylene epoxide. The tube is sealed and heated for 6 hours at 50° C. The liquid contents of the tube are distilled and 20 g. of 3,6-dioxa-2,4-di(trifluoromethyl) heptafluoroheptanoyl fluoride is isolated. The material is then hydrolyzed by treatment with 10 ml. of water, and the fluorocarbon layer is separated and dried by azeotropic distillation of the water with benzene. The acid is treated with ammonia in the ether solution to convert it to the ammonium salt.

As indicated by the foregoing description, the formation of the acid or the salt from the acid fluoride is readily achieved by hydrolysis in the case of the acid, and in the case of the salt by the simultaneous or subsequent reaction with a basic compound or by the direct reaction of the basic compound with the polyether acid fluoride.

The dispersing agents employed in the process of the present invention comprise a perfluoropolyether acid radical and a hydrophilic group. As indicated above, the number of repeating divalent polyether radicals can be from zero in the case of the dimer, to about 10, although preferably $n$ is from 1 to 5. The specific hydrophilic group is not critical provided it confers upon the compound as a whole a solubility in water of at least 0.1% at 100° C., which is necessary for the dispersing agent to perform satisfactorily in aqueous polymerization systems. The term "water-soluble" as applied herein to the dispersing agent denotes a minimum solubility in water of 0.1% at 100° C. Although the free acids can be used, their solubility is rather low. For this reason, it is preferred to use these acids in the form of salts. These salts of the polyether acids include, for example, the ammonium and alkali metal (e.g., sodium, potassium or lithium) salts; salts of these acids with saturated alkyl amines, preferably of 1 to 4 carbon atoms, i.e., substituted ammonium salts, can also be used to advantage as well as salts of quaternary ammonium bases, such as, for example, tetramethyl ammonium hydroxide. It is not necessary to use a salt of an isolated individual acid. On the contrary, since the starting polyethers are generally obtained as mixtures of polyethers of different degree of polymerization, it may be more economic to use mixtures.

The quantity of dispersing agent employed in the polymerization of the polymerizable ethylenic monomer depends on the monomer itself as well as on the conditions of polymerization. In general, the concentration of the dispersing agent is from 0.001 to 10% by weight of the aqueous medium, and, preferably, from 0.05 to 0.3%. The latter range is particularly suitable in the polymerization of halogenated ethylenes.

The invention is further illustrated in greater detail in the following examples in which parts are by weight, unless otherwise stated.

*Examples I–XVIII.*—Into a two-gallon, stirred, horizontal autoclave was charged 200 g. of paraffin wax, 0.0065 g. of iron powder, 2500 ml. of distilled deoxygenated water and the quantity and type of dispersing agent indicated in the table. The autoclave was evacuated and pressured to 25 p.s.i.g. with tetrafluoroethylene and heated to 70° C. Then a solution of 1.623 g. of disuccinic acid peroxide in 750 ml. of distilled and deoxygenated water was added and the system was agitated and heated to 85° C. The tetrafluoroethylene pressure was increased to 390 to 400 p.s.i.g. In the last three examples of this series (i.e., XVI–XVIII), 7.7 ml. of liquid hexafluoropropylene was injected into the reaction zone with tetrafluoroethylene. The tetrafluoroethylene pressure was maintained at that level by continuous addition during the polymerization. The polymerization was continued until the desired amount of tetrafluoroethylene was absorbed. The concentration of the resulting dispersion (i.e., percent solids), the total polymer produced, the coagulum resulting, the specific gravity of the resulting polymer and the space-time yields were determined and are listed in Table I. The specific gravity was measured in accordance with ASTM-D-1475-56T. Average particle size was determined by light transmission and/or ultracentrifuge as indicated in the table.

TABLE I

| Example | Dispersing agent | Wt. of disp. agent in g. | Space-time yield in g./l hr. | Dispersed solids in percent | Polymer produced in g. | Coagulum (dry wt.) in g. | Particle diameter in microns | | Specific gravity |
|---|---|---|---|---|---|---|---|---|---|
| | | | | | | | Light trans. | Ultra-centr. | |
| I | $CF_3CF_2CF_2-O-CF(CF_3)CF_2OCF(CF_3)COONH_4$ Ammonium-3,6-dioxa-2,4-di(trifluoromethyl)undecafluorononanoate. | 4.9 | 347 | 35.0 | 1710 | trace | 0.245 | | 2.216 |
| II | $CF_3CF_2OCF(CF_3)CF_2OCF(CF_3)COONH_4$ Ammonium-3,6-dioxa-2,4-di(trifluoromethyl)nonafluorooctanoate. | 4.9 | 324 | 32.9 | 1577 | trace | 0.208 | 0.222 | 2.207 |
| III | $CF_3-OCF(CF_3)CF_2OCF(CF_3)COONH_4$ Ammonium-3,6-dioxa-2,4-di(trifluoromethyl heptafluoroheptanoate. | 4.9 | 414 | 35.4 | 1744 | trace | 0.224 | | 2.208 |
| IV | $CF_3CF_2CF_2OCF(CF_3)CF_2OCF(CF_3)COONH_3CH_3$ | 4.9 | 318 | 34.1 | 1700 | trace | 0.275 | | 2.210 |
| V | $CF_3CF_2CF_2OCF(CF_3)CF_2OCF(CF_3)COONH_2(CH_3)_2$ | 4.9 | 345 | 35.1 | 1711 | trace | 0.262 | | 2.222 |
| VI | $CF_3CF_2CF_2OCF(CF_3)CF_2OCF(CF_3)COONH(CH_3)_3$ | 4.9 | 403 | 35.0 | 1679 | trace | 0.299 | 0.300 | 2.216 |
| VII | $CF_3CF_2CF_2OCF(CF_3)CF_2OCF(CF_3)COON(CH_3)_4$ | 4.9 | 336 | 33.0 | 1650 | trace | 0.283 | | 2.228 |
| VIII | $CF_3CF_2CF_2OCF(CF_3)CF_2OCF(CF_3)COONH_3CH_2OH$ | 4.9 | 333 | 35.1 | 1711 | trace | 0.262 | | 2.220 |
| IX | $CF_3CF_2CF_2O-CF(CF_3)CF_2OCF(CF_3)COONa$ | 4.9 | 400 | 35.0 | 1730 | trace | 0.245 | | 2.216 |
| X | $CF_3CF_2CF_2O[CF(CF_3)CF_2O]_2CF(CF_3)COONH_4$ | 4.9 | 255 | 33.9 | 1597 | trace | 0.254 | | |
| XI | $CF_3CF_2CF_2O[CF(CF_3)CF_2O]_3CF(CF_3)COONH_4$ | 4.9 | | 20.4 | | 500 | 0.262 | | |
| XII | $CF_3CF_2CF_2OCF(CF_3)COOH$ | 5.0 | 312 | 20.7 | 1243 | 500 | 0.250 | | 2.217 |
| XIII | $CF_3CF_2CF_2OCF(CF_3)CF_2O-CF(CF_3)COOH$ | 4.9 | 423 | 33.7 | 1610 | 50 | 0.263 | 0.280 | 2.216 |
| XIV | $CF_3CF_2CF_2O[CF(CF_3)CF_2O]_2CF(CF_3)COOH$ | 8.0 | 368 | 28.3 | 1252 | 29 | 0.272 | | 2.206 |
| XV | $CF_3CF_2CF_2O[CF(CF_3)CF_2O]_3CF(CF_3)COOH$ | 8.0 | 417 | 20.2 | 1143 | 417 | 0.288 | | 2.210 |
| XVI | $CF_3CF_2O[CF_2CF_2O]_4CF_2COONH_4$ | 1.8 | 243 | 34.4 | 1733 | 113 | 0.176 | | 2.220 |
| XVII | $CF_3CF_2O(CF_2CF_2O)_2CF_2COONH_4$ | 2.5 | 290 | 34.0 | 1645 | trace | 0.152 | 0.195 | 2.217 |
| XVIII | $CF_3CF_2CF_2OCF(CF_3)CF_2OCF(CF_3)COONH_4$ | 2.5 | 191 | 33.6 | 1630 | trace | 0.152 | | 2.218 |

*Example XIX.*—Into a 320 ml. stainless steel autoclave is charged 100 ml. of water, 0.2 g. of potassium persulfate, 1.0 g. of ammonium-3,6-dioxa-2,4-di(trifluoromethyl) undecafluorononanoate and 2.5 g. of paraffin wax. The autoclave is cooled with Dry Ice, evacuated and 50 g. of chlorotrifluoroethylene is injected. The autoclave is heated to 40° C. and agitated for a period of 16 hours. A stable, colloidal dispersion of polychlorotrifluoroethylene is obtained.

*Example XX.*—Into a glass vessel, maintained in a nitrogen atmosphere is charged 100 ml. of water, 25 g. of styrene, 0.1 g. of potassium persulfate and 1.0 g. of ammonium-3,6-dioxa-2,4-di(trifluoromethyl)undecafluorononanoate. The mixture is mildly agitated for a period of 10 hours at a temperature of 60° C. Unreacted styrene is removed by steam distillation. A stable colloidal dispersion of polystyrene is obtained.

*Example XXI.*—Into a glass vessel is charged under nitrogen 100 ml. of water, 50 g. of acrylonitrile, 0.1 g. of potassium persulfate and 1.0 g. of ammonium-3,6-dioxa-2,4-di(trifluoromethyl)undecafluorononanoate. The vessel is agitated for a period of 16 hours at a temperature of 45° C. A stable aqueous dispersion of polyacrylonitrile is obtained.

*Example XXII.*—Into a 320 ml. stainless steel autoclave is charged 100 ml. of water, 0.05 g. of potassium persulfate, 45 g. of vinyl acetate and 1.0 g. of ammonium-3,6-dioxa-2,4 - di(trifluoromethyl)undecafluorononanoate. The autoclave is agitated under autogenous pressure for a period of 4 hours at a temperature of 45° C. A stable aqueous dispersion of polyvinyl acetate is obtained.

*Example XXIII.*—A paddle stirred stainless steel reactor having a length to diameter ratio of about 1.5 and a water capacity of 80.7 parts is evacuated, charged with 46 parts of demineralized water, containing 0.1 weight percent of ammonium-3,6-dioxa-2,4-di(trifluoromethyl) undecafluorononanoate and purged of gases. The degasified charge is heated to 120° C., pressured to 390 p.s.i.g. with hexafluoropropylene and made $2.9 \times 10^{-4}$ molal with respect to potassium persulfate by addition of an aqueous solution of potassium persulfate. The reactor is stirred and is then further pressurized to 600 p.s.i.g. with a 75/25 mixture of hexafluoropropylene and tetrafluoroethylene while additional potassium persulfate is injected so that after 15 minutes of addition the calculated concentration of undecomposed persulfate is $7.85 \times 10^{-5}$ molal. Sufficient potassium persulfate is continuously added to maintain the free radical generation at about 2.6×10⁻⁵ moles per minute per liter of solution. The stirring of the reactor contents at 120° C. and the addition of potassium persulfate are continued for 100 minutes after the 600 p.s.i.g. pressure is attained. During this period the pressure is maintained constant by the continuous addition of tetrafluoroethylene. At the end of the 100 minutes, the agitation is discontinued, the reactor is vented and the liquid reaction mixture is discharged. There is obtained 7.3 parts of a copolymer of tetrafluoroethylene and hexafluoropropylene colloidally dispersed in the water.

It will be understood that the foregoing examples are merely illustrative and that the present invention broadly comprises the use of the described dispersing agents in the polymerization of ethylenically unsaturated monomers in an aqueous medium to obtain an aqueous dispersion of polymer. The polymerizations described, particularly those relating to the polymerization of tetrafluoroethylene, have incorporated various features described in the prior art. Thus, the use of paraffin wax is described in U.S. 2,612,484, issued to S. J. Bankoff, September 20, 1952, and the use of iron powder is described in U.S. 2,750,350, issued to A. E. Kroll, June 12, 1956.

Although the invention is broadly applicable to the polymerization of ethylenically unsaturated monomers which have been established in the art as being polymerizable in aqueous media, it is of particular value in the polymerization of halogenated monomers which have a tendency to react with common dispersing agents or the polymerization of which is inhibited by such dispersing agents.

In general, the monomers polymerized to aqueous dispersions of polymers using the aforesaid dispersing agents are terminally unsaturated and have the general formula

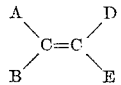

where A and B are hydrogen or halogen (fluorine, chlorine, bromine or iodine) and D and E are hydrogen, halogen, alkyl, haloalkyl, aryl, aralkyl, cyano, carboxy, carboalkoxy, acyloxy, aldehyde, ketone, amido and imido, ether, perhaloether groups and the like. Thus, specific examples of these monomers are ethylene, propylene, vinyl chloride, vinylidene chloride, vinyl fluoride, vinyl acetate, vinyl butyrate, acrylic acid, methacrylic acid, methyl acrylate, butyl acrylate, ethyl methacrylate, acrylamide, methacrylamide, acrylonitrile, methacrolein, acrolein, methyl vinyl ketone, methyl vinyl ether, ethyl vinyl ether, vinyl pyridine, itaconic acid, diethyl fumarate, dimethyl fumarate and the like.

A particularly preferred class of monomers, as already indicated, are halogenated monomers and, particularly, those which have the general formula $CF_2=CFR$ where R is chlorine, fluorine, perfluoroalkyl, perfluoroalkoxy, and copolymers of these halogenated monomers with each other and the monomers described hereinabove.

The dispersions obtained by the process of the present invention, and, particularly, those obtained from the polymerization of perhalogenated monomers, differ from those generally obtained with other fluorinated dispersing agents, particularly with respect to the particle size. Thus, whereas the prior art polymer dispersions have particle sizes around 0.2 micron and smaller, the particle size of the dispersions obtained by the process of the present invention have particle sizes generally above 0.2 micron. This increase of particle size is highly beneficial in some applications of the dispersion. Thus, it is possible to obtain thicker coatings of polymer when the dispersion is applied to a surface without causing "mud-cracking."

The aqueous dispersions of the present invention have many applications. Thus, they can be used in the spinning of fibers, in the coating of wood, metal, ceramics, textiles and the like, and in the casting of tough, flexible, coherent unsupported films. All of these applications have been described in the literature and, thus, no further detailed description is deemed necessary.

What is claimed is:
1. In the polymerization of a monoethylenically unsaturated monomer composition in an aqueous medium to obtain a colloidal dispersion of polymer employing a water-soluble polymerization initiator, the step of carrying out the polymerization in the presence of an ionizable dispersing agent, said dispersing agent being a compound having a solubility of at least 0.1% at 100° C. and having the general formula

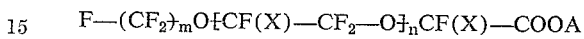

where X is a member of the class consisting of fluorine and the perfluoromethyl radical, m is a positive integer from 1 to 5 inclusive, n is a positive integer from 0 to 10 inclusive, and A is a hydrophilic radical selected from the class consisting of hydrogen, ammonium radical, alkali metals, and substituted ammonium radicals.

2. The process as set forth in claim 1 wherein the concentration of the dispersing agent is from 0.001 to 10%.
3. The process as set forth in claim 1 wherein the monomer composition is a halogenated ethylene.
4. The process as set forth in claim 1 wherein the monomer composition is tetrafluoroethylene.
5. The process as set forth in claim 1 wherein A is hydrogen.
6. The process as set forth in claim 1 wherein A is the ammonium radical.
7. The process as set forth in claim 1 wherein A is an alkali metal.
8. The process as set forth in claim 1 wherein A is a substituted ammonium radical.
9. In the polymerization of a monoethylenically unsaturated monomer composition in an aqueous medium to obtain a colloidal dispersion of polymer employing a water-soluble polymerization initiator, the step of carrying out the polymerization in the presence of an ionizable, water-soluble dispersing agent having the general formula

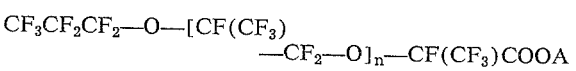

where n is a positive integer from 0 to 3 inclusive and A is a hydrophilic radical selected from the class consisting of hydrogen, ammonium radical, alkali metals, and substituted ammonium radicals.

10. The process as set forth in claim 9 wherein the monomer composition is a halogenated ethylene.
11. The process as set forth in claim 9 wherein the monomer composition is tetrafluoroethylene.
12. The process as set forth in claim 9 wherein the monomer composition is a combination of tetrafluoroethylene and hexafluoropropylene.
13. The process as set forth in claim 9 wherein the dispersing agent is ammonium-3,6-dioxa-2,4-di(trifluoromethyl)-undecafluorononanoate.
14. The process as set forth in claim 1 wherein the dispersing agent is ammonium-3,6-dioxa-2,4-di(trifluoromethyl)-nonafluorooctanoate.
15. The process as set forth in claim 1 wherein the dispersing agent is ammonium-3,6-dioxa-2,4-di(trifluoromethyl)-heptafluoroheptanoate.
16. The process as set forth in claim 1 wherein the dispersing agent is ammonium-3,6-dioxa-undecafluorooctanoate.
17. The process as set forth in claim 1 wherein the dispersing agent is ammonium-3,6,9-trioxa-pentadecafluoroundecanoate.
18. A stable aqueous dispersion of the polymer of a monoethylenically unsaturated monomer composition, said dispersion containing as dispersing agent an ionizable compound having a solubility of at least 0.1% at 100° C. and having the general formula $$F(CF_2)_m\text{—}O\text{—}[CF(X)\text{—}CF_2\text{—}O\text{—}]_n\text{—}CF(X)COOA$$

where X is a member of the class consisting of fluorine and the perfluoromethyl radical, $m$ is a positive integer from 1 to 5 inclusive, $n$ is a positive integer from 0 to 10 inclusive and A is a hydrophilic radical selected from the class consisting of hydrogen, ammonium radical, alkali metals, and substituted ammonium radicals.

19. The dispersion as set forth in claim 18 wherein the dispersing agent is employed in concentrations of 0.001 to 10% by weight of the aqueous medium.

20. The dispersion as set forth in claim 18 wherein A is the ammonium radical.

21. The dispersion as set forth in claim 18 wherein the monomer composition is tetrafluoroethylene.

References Cited by the Examiner
UNITED STATES PATENTS

| | | | |
|---|---|---|---|
| 2,559,752 | 7/1951 | Berry | 260—29.6 |
| 2,713,593 | 7/1955 | Brice | 260—535 |
| 3,125,599 | 3/1964 | Warnell | 260—535 |

SAMUEL H. BLECH, *Primary Examiner.*

LEON J. BERCOVITZ, MURRAY TILLMAN, *Examiners.*

H. L. SATZ, W. J. BRIGGS, *Assistant Examiners.*